(12) United States Patent
Takagi et al.

(10) Patent No.: US 6,968,915 B2
(45) Date of Patent: Nov. 29, 2005

(54) FUEL CELL AUTOMOBILE CAPABLE OF REDUCING VIBRATION

(75) Inventors: Narihiro Takagi, Saitama (JP); Takuma Kanazawa, Saitama (JP); Koji Katano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 114 days.

(21) Appl. No.: 10/400,899

(22) Filed: Mar. 27, 2003

(65) Prior Publication Data

US 2003/0186092 A1     Oct. 2, 2003

(30) Foreign Application Priority Data

Mar. 28, 2002  (JP)  .............................. 2002-091002

(51) Int. Cl.[7] .............................................. B60K 1/00
(52) U.S. Cl. ..................................................... 180/65.3
(58) Field of Search ............................. 180/65.1, 65.2, 180/291, 297, 299, 65.3; 429/12, 13, 26

(56) References Cited

U.S. PATENT DOCUMENTS

| | | | | |
|---|---|---|---|---|
| 4,678,723 A | * | 7/1987 | Wertheim | 429/17 |
| 4,973,528 A | * | 11/1990 | Sanderson | 429/12 |
| 5,837,393 A | * | 11/1998 | Okamoto | 429/20 |
| 6,306,532 B1 | * | 10/2001 | Kurita et al. | 429/20 |
| 6,428,919 B1 | * | 8/2002 | Takahashi et al. | 429/19 |
| 6,759,153 B1 | * | 7/2004 | Lamm et al. | 429/13 |
| 2003/0186092 A1 | * | 10/2003 | Takagi et al. | 429/12 |
| 2004/0048124 A1 | * | 3/2004 | Yamada | 429/26 |
| 2004/0094340 A1 | * | 5/2004 | Kawasaki et al. | 180/65.1 |
| 2004/0108151 A1 | * | 6/2004 | Guidry et al. | 180/65.3 |
| 2004/0265654 A1 | * | 12/2004 | Imaseki et al. | 429/13 |

FOREIGN PATENT DOCUMENTS

| | | |
|---|---|---|
| JP | 2000-313239 | 11/2000 |
| JP | 2003-291657 | * 10/2003 |
| JP | 2004-161055 | * 6/2004 |

* cited by examiner

*Primary Examiner*—Bryan Fischmann
(74) *Attorney, Agent, or Firm*—Lahive & Cockfield, LLP; Anthony A. Laurentano, Esq.

(57) ABSTRACT

A fuel cell automobile is provided with a fuel cell and an integral module including a drive module, a compression module, and an intercooler. At least one portion of the integral module is mounted to a body of the automobile by way of a mount. Further, a compressed air cooled using the intercooler is supplied to the fuel cell by way of a pipe at least portion of which is made of a resilient member.

7 Claims, 4 Drawing Sheets

FUEL CELL AUTOMOBILE CAPABLE OF REDUCING VIBRATION

FIELD OF THE INVENTION

The present invention relates to a fuel cell automobile to which a fuel cell is loaded, particularly a fuel cell automobile provided with a configuration which can reduce vibration around a compressor in an air supply system for supplying an air to the fuel cell.

BACKGROUND OF THE INVENTION

Recently, it has been noted that a polymer electrolyte fuel cell (so called "PEFC" which is "polymer electrolyte fuel cell") as a driving source or the like used for a fuel cell automobile. The PEFC can generate an electric power even at normal temperatures, resulting in that the PEFC is applied to various usages.

Generally, a fuel cell system is constituted so that a proton-conductive high-polymer electrolytic layer (so called "PEM layer") is sandwiched a cathode at one side and an anode at the other side. And, the fuel cell system generates an electric power by an electrochemical reaction between oxygen in an air supplied to the cathode and hydrogen supplied to the anode. The electric power generated using the fuel cell is used for a main motor that drives the fuel cell automobile, a drive motor such as a cooling water circulation pump and a compressor served as auxiliaries, and the like.

In view of efficiency of generation of an electric power, an air supply system used for such a fuel cell battery system is driven, e.g. under an air compressor defined by 200–300 [kPaG] at maximum. Temperature of a compressed air using the compressor becomes higher (at 100° C. or more) by a compressed heat and thereafter the compressed air is exhausted. Further, the air exhausted from the compressor is supplied to the fuel cell after the compressed air is cooled by way of an intercooler built in a cooling system of the fuel cell, because the fuel cell system is driven at a temperature for activating the fuel cell being lower than a temperature of the air exhausted from the compressor.

As a related art thereto, JP 2000-313239A discloses a fuel cell automobile to which such a fuel cell system is loaded. A drive module having a main motor on an upper portion of which a compressor and the like are attached and a transmission connected to the main motor are loaded, by way of a rubber mount for absorbing vibration, to a body of the fuel cell automobile. According to this configuration, the rubber mount can serve as both a vibration absorber and a mounting member by loading the compressor to the upper portion of the drive module, resulting in that the vibration of the compressor is, by way of the drive module, absorbed by the body of the automobile and a room in the automobile is effectively used.

SUMMARY OF THE INVENTION

An object of the present invention resides in that a fuel cell automobile can be provided, which can greatly damp vibration to be transmitted from a drive module, a compressor, and an intercooler. The other object of the present invention resides in that vibration of each of the drive module, the compressor, and the intercooler can be absorbed using a pipe member arranged between the drive module and the fuel cell.

According to a first aspect of the present invention, there is provided a fuel cell automobile having: a fuel cell generating an electric power by electrochemical reaction by supplying a fuel gas and an air to the fuel cell; an integral module including a compressing module, a drive module, and a cooling module as an integral unit in a body of the fuel cell automobile; the drive module having a transmission and a main motor for running the fuel cell automobile; the cooling module cooling a compressed air using the compressor module; the compressor module compressing air supplied to the fuel cell; a mounting member that has at least one portion of the integral module mounted to a body of the fuel cell automobile; and a pipe member at least one portion of which is made by a resilient member and that supplies the compressed air cooled using the cooling module for the fuel cell.

Through the first aspect, following effect can be obtained. The drive module, the compressing module, and the cooling module are formed as the integral module, resulting in that the vibration generated from the cooling module is absorbed using the compressing module and the drive module and the vibration is greatly damped. Further, the integral module that has absorbed the vibration like this is mounted to the body of the automobile by way of the mounting member, resulting in that the vibration to be transmitted from the cooling module to the body thereof can be greatly damped. Further, the compressed air to be cooled using the cooling module passes through the pipe member to be arranged between the integral module and the fuel cell, resulting in that at least one portion of the pipe member is constituted by a resilient member. Further, at least one portion of the pipe member arranged between the integral module and the fuel cell is constituted by the resilient member, resulting in that even if each of the modules forming the integral module is vibrated, vibrations from these modules can be absorbed using the resilient member, in other words, the vibration generated from the integral module is not transmitted to the fuel cell. Further, the compressed air whose sound energy is decreased by cooling the compressed air using the cooling module passes through the pipe member, resulting in that a noise to be generated from the pipe member can be prevented. Further, at least one portion of the pipe member is constituted by the resilient member, resulting in that maintenance can be independently applied to each of the integral module and the fuel cell. For example, in a case where the fuel cell is removed from the body of the fuel cell automobile, the pipe member can be removed from the fuel cell, reforming the resilient member, resulting in that the fuel cell can be removed while the integral module remains as it stands in the body of the fuel cell automobile. Furthermore, also in a case where the integral module is removed from the body of the automobile, the integral module can be removed independently with relative to the fuel cell.

According to a second aspect of the present invention, there is provided a fuel cell automobile in accordance with the first aspect, in which the fuel cell is arranged at a predetermined interval independently with relative to the integral module and the resilient member constituting the pipe member being arranged between the fuel cell and the integral module.

Through the second aspect, following effect can be obtained.

In addition to the effect through the first aspect, the resilient member is arranged between the integral module and the fuel cell, resulting in that maintenance is applied to the resilient member by easily accessing to the maintenance portion for the resilient member from between the integral module and the fuel cell.

According to third or fourth aspect of the present invention, in the configuration of the first and second aspects, there is provided a fuel cell automobile in accordance with the first aspect, in which the integral module is arranged at a location of being forward with relative to the fuel cell automobile and the cooling module being arranged at a location of being a rearmost portion of the integral module so that the cooling module is arranged inwardly with relative to a steering axle of said automobile and at an inside of said body of said automobile.

Note that in this specification, a term "virtual steering axle" is defined as a steering axle to be provided in the fuel cell automobile if the right-hand-steering axle and the left-hand-steering axle provisionally simultaneously exist in the fuel cell automobile.

Through the third or fourth aspect, following effect can be obtained. The cooling module to be arranged at the rearmost portion of the integral module is arranged inwardly with relative to each of locations of the virtual axles in a lateral direction i.e., in a width direction of the body of the automobile, a position of a steering axle can be freely selected.

The other aspects will be explained in below-mentioned descriptions.

DESCRIPTION OF THE PREFERRED EMBODIMENTS

It will be explained about details of the fuel cell automobile relating to the present invention, referring to the attached drawings.

Figure 1:
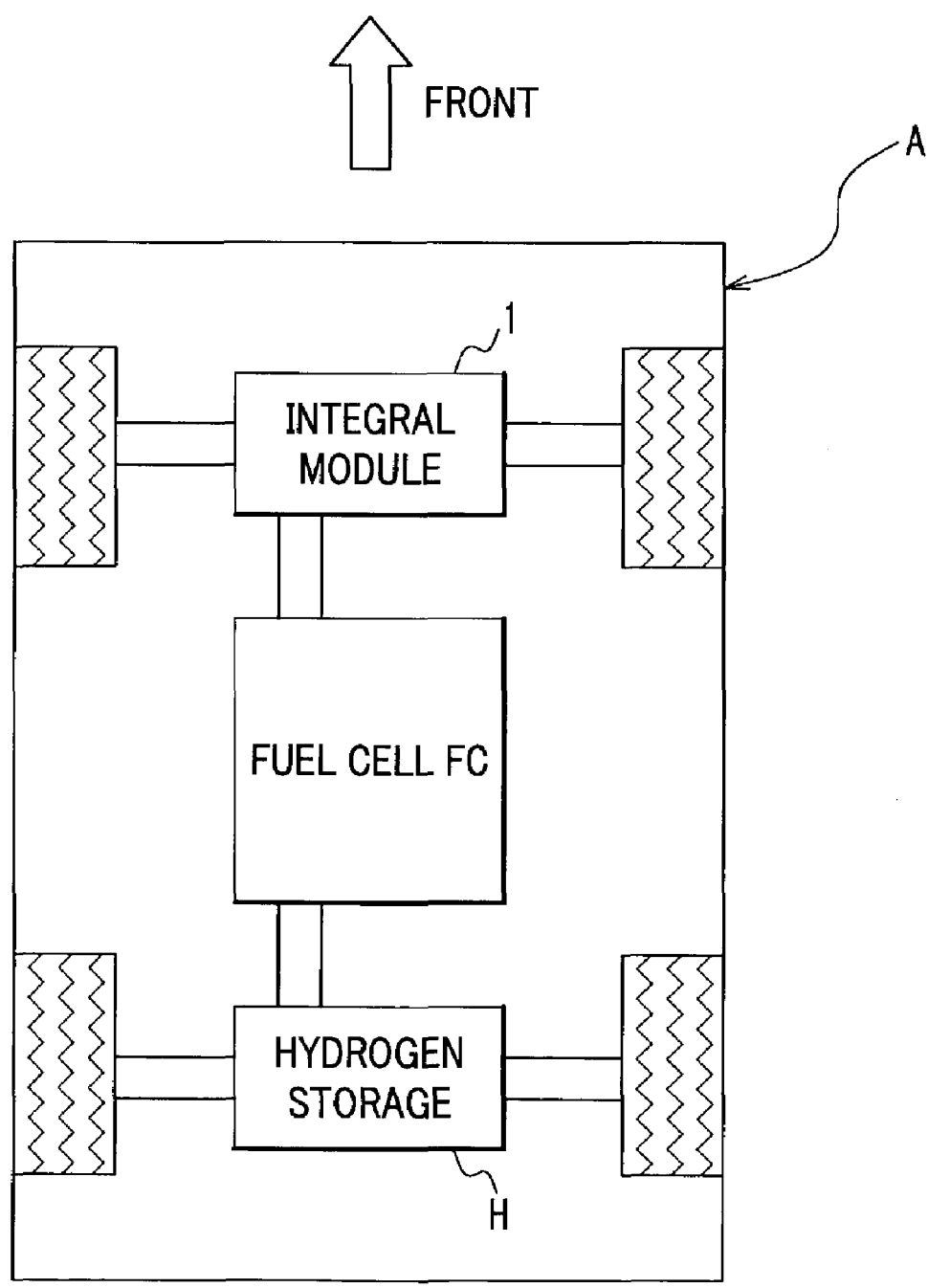
FIG. 1 is a schematic plan view for showing a fuel cell automobile relating to the present invention.

As shown in FIG. 1, fuel cell automobile A is substantially provided with integral module 1, fuel cell FC, and hydrogen storage H. Integral module 1 is arranged at a foremost portion of a body of the fuel cell automobile, including compressor module 3 (refer to Fig.2) that compresses an air supplied to fuel cell FC. Fuel cell FC is, so to speak, a polymer electrolyte fuel cell, which generates an electric power by an electrochemical reaction between an oxygen in a compressed air and a hydrogen gas (used for fuel gas). And, below-mentioned main motor 21, motor used for compressor 32 (also called "compressor motor 32"), and the like are driven by the generated electric power supplied by FC. Further, fuel cell FC is arranged backward relative to integral module 1 by predetermined interval. In the present embodiment, fuel cell FC is further arranged at an under portion of passenger's room of fuel cell automobile A. Hydrogen storage H is for storing fuel to be supplied to fuel cell FC. Note that any other storage mode is available using hydrogen storage H in the present invention while a high-compressed-hydrogen tank is used in which a compressed hydrogen gas is stored in the present embodiment.

Figure 2:
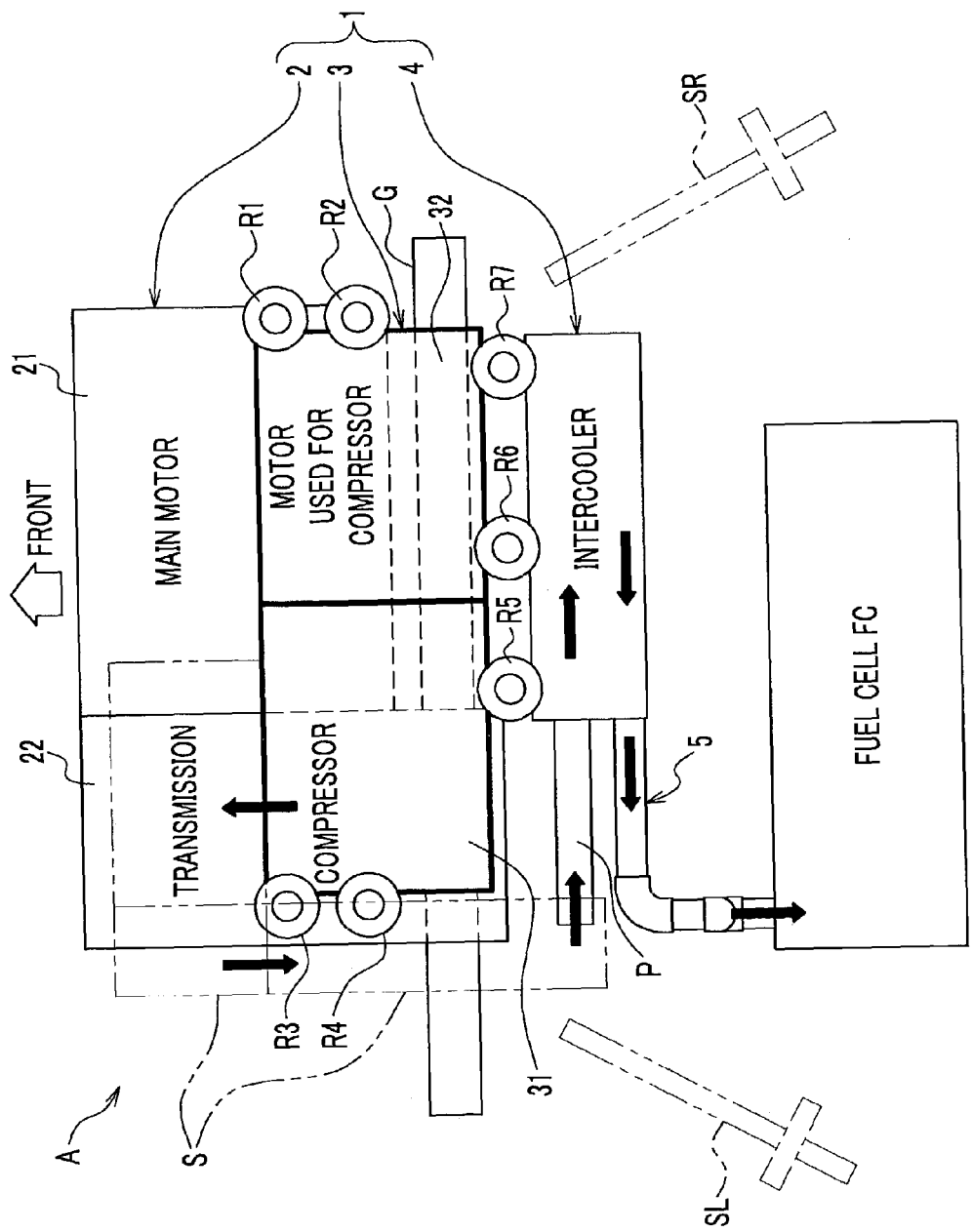
FIG. 2 is a schematic plan view for showing an integral module and a cell fuel to be mounted to the fuel cell automobile relating to the present invention.
Figure 3:
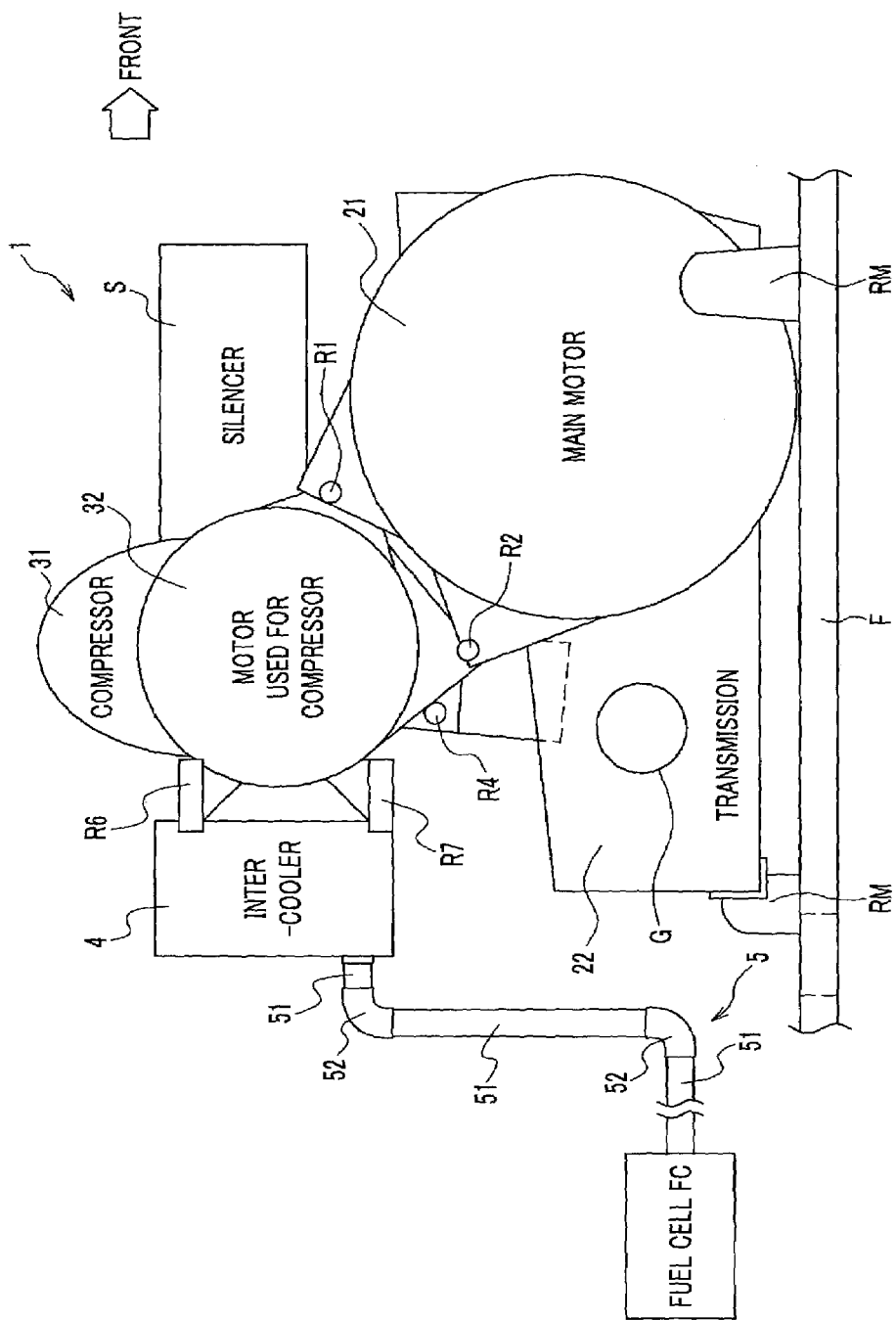
FIG. 3 is a schematic side view for showing the integral module and the fuel cell in FIG. 2.

As shown in FIG. 2 and FIG. 3, integral module 1 is provided with drive module 2 that drives and runs fuel cell automobile A, compressor module 3 that compresses an air to be supplied to fuel cell FC, and intercooler (also called "cooling module") 4 that cools a compressed air exhausted from compressor module 3. Integral module 1 is mounted to body frame F by way of rubber mount (also called "mountingmember") RM that absorbs vibration, arranged at both lateral sides and a rear side of the body of drive module 2.

Drive module 2 is substantially provided with main motor 21 for running fuel cell automobile A to be driven by supplying an electric power from fuel cell FC to fuel cell automobile A and transmission 22 that converts a torque of main motor 21 to a predetermined torque and transmits the converted predetermined torque to axle G. Rubber mounts R1, R2 are arranged at a right and upper portion of main motor 21 while rubber mounts R3, R4 are arranged at left and upper portion of transmission 22.

Compressor module 3 is substantially provided with compressor 31 that compresses external air and compressor motor 32 that drives compressor 31. Compressor 31 is fixed to an upper portion of transmission 22 by way of rubber mounts R3, R4. Motor used for compressor 32 is fixed at an upper portion by way of rubber mounts R1, R2. In other words, compressor module 3 is fixed to the upper portion of drive module 2 using rubber mounts R1, R2, R3, and R 4 at four fixing portions corresponding to these four rubber mounts. Compressed air using compressor 31 is supplied to intercooler 4 by way of pipe member P and silencer S for preventing a sound from being leaked toward outside.

Intercooler 4 is arranged at the rearmost portion of integral module 1, i.e. arranged adjacent to a rear side of compressing module 3 while intercooler 4 is arranged at a location more inward than locations of virtual steering sides SL, SR to be virtually arranged at both sides in fuel cell automobile A in a direction along the axle. In other words, Intercooler 4 as the cooling module is housed between a right-hand-steering axle and a left-hand-steering axle if the right-hand-steering axle and the left-hand-steering axle provisionally simultaneously exist in fuel cell automobile A. The left side of intercooler 4 is fixed to the rear side of compressor 31 by way of rubber mount R5. A portion over from the center to the right side of intercooler 4 is fixed to a rear side of compressing motor 32 by way of rubber mounts R6 and R7 as shown in FIG. 2 and FIG. 3. In other words, intercooler 4 is fixed to a rear portion of compressing module 3 using rubber mounts R5, R6, and R7 at the three fixing portions corresponding to the three rubber mounts. Further, the compressed air cooled using intercooler 4 is supplied to fuel cell FC by way of pipe member 5.

Figure 4:
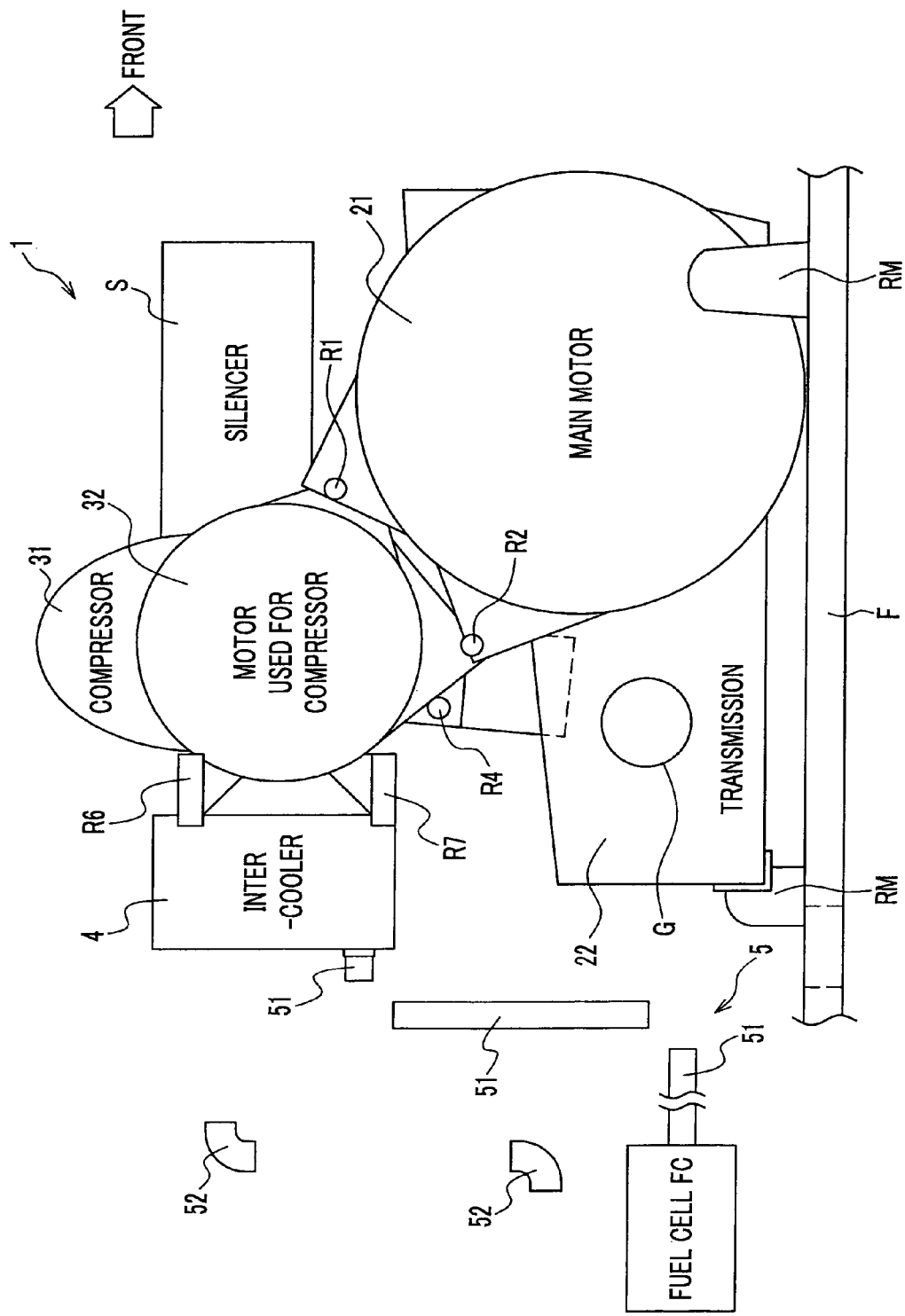
FIG. 4 is a schematic side view for showing a detachable pipe member between the integral module and the fuel cell.

Further, pipe member 5 including metal pipe 51 and elbows 52 can be removed from fuel cell FC as shown in FIG. 4. Pipe 5 is substantially constituted by metal pipe 51 for preventing a sound such as a noise from being leaked to outside and an elbow made of rubber (also called "resilient member") 52 for absorbing vibration. Elbow 52 is arranged backward with relative to integral module 1 and forward with relative to fuel cell FC. Note that it is not necessary for pipe 5 to have two elbows 52 as employed therein. Namely, at least one portion of pipe 5 has only to be made of a resilient member. Therefore, for example, elbow 52 as employed in the present embodiment has only to be provided therein by an only single piece.

It will be explained about operation for damping vibration from integral module 1, referring to Fig.2.

If intercooler 4 is driven and vibrated, then the vibration is transmitted to compressing module 3 by way of rubber mounts R5, R6, and R7 and damped using compressing module 3. Further, if the vibration damped using compressor 3 is transmitted to drive module 2 by way of rubber mounts R1, R2, R3, and R4 and further damped using drive module 2. Also, vibration greatly damped using compressing module 3 and drive module 2 like this is furthermore damped and the damped vibration is transmitted to the body of fuel cell automobile A.

According to the above-mentioned descriptions, following effect can be obtained in the present embodiment.

(1) Vibration from intercooler 4 is damped using compressing module 3 and drive module 2, resulting in that the vibration to be transmitted from intercooler 4 to the body of fuel cell automobile A can be greatly damped.

(2) Elbow 52 is arranged between integral module 1 and fuel cell FC, resulting in that maintenance of elbow 52 can be performed between integral module 1 and fuel cell FC. Vibration generated from integral module 1 is absorbed using elbow 52, resulting in preventing the vibration from being transmitted to fuel cell FC.

(3) Intercooler 4 at the rearmost portion of integral module 1 is arranged inward with relative to locations of the virtual steering axles SL,SR in the lateral direction of fuel cell automobile A, resulting in that a location of a steering axle can be freely selected. Therefore, there is no necessity that a configuration of fuel cell automobile A is modified by each time mutually between a left-handle-steering mode and a right-handle-steering mode, resulting in that a fabrication cost can be more lowered.

(4) Intercooler 4 is arranged, adjacent to a rear side of compression module 3, so that compressor 31 and intercooler 4 are fixed at the same base (e.g., compression motor 32), resulting in that the affection of vibration on the pipe, which is arranged between compressor 31 and intercooler 4, can be lessened. Thus, compressor 31 can be joined to intercooler 4 using pipe P, resulting in that leakage of the sound can be greatly prevented.

(5) Drive module 2, compression module 3, and intercooler 4 are formed as integral module 1, resulting in that modules 2, 3 can be inspected at the same time when module 1 is inspected.

(6) The compressed air cooled by intercooler 4 passes through pipe 5 to be arranged between integral module 1 and fuel cell FC, so that elbow 52 for absorbing vibration used for pipe 5 can be used. Thus, the vibration of the integral module 1 can be absorbed using elbow 52.

(7) Intercooler 4 is supported using rubber mounts R6, R7 at a side of compressing motor 2 whose vibration input is smaller than vibration input of compressor 31 at two fixing points, resulting in that a sound and vibration to be transmitted from compressor module 3 to intercooler 4.

(8) Without intercooler 4 being fixed to compressing motor 32 at three fixing points, a single point among the three fixing points is fixed to a side of compressor 31, rubber mounts R5, R6, and R7 can be arranged by a well-balanced pitch.

As above-mentioned, the embodiments have been described. However, the present invention is not limited within gist of each of the above embodiments. The other embodiments can be modified within a scope of the present invention.

For example, mounting member RM and R1 to R7 have been adopted as mounts. Alternatively, any other than these mounts can be adopted. Because the mount has only to prevent integral module 1 from being vibrated, the mount can be replaced by a resin mount or the like. Further, needless to say, a number of rubber mount and/or mounts R1 to R7 is not limited by seven numbers. Such numbers can be properly modified. Additionally, elbow 52 has been adopted as a resilient member. Alternatively, a whole pipe member is constituted by a rubber hose.

What is claimed is:

1. A fuel cell automobile comprising:
   a body;
   a fuel cell supported by the body at an under region of a passenger's room of the fuel cell automobile for generating electric power by electrochemical reaction between hydrogen and oxygen;
   an integral module at a front region of the fuel cell automobile including a compressor module, a drive module, and a cooling module, the cooling module being arranged at a rearmost portion of the integral module;
   a mounting member, a part of the integral module being supported by the body through the mounting member;
   a pipe member at least partially comprising a detachable resilient pipe,
   wherein the drive module comprises a transmission and a main motor, the compressor module supplies compressed air to the fuel cell through the pipe member, the cooling module cools the compressed air from the compressor to supply cooled compressed air to the fuel cell, wherein the resilient pipe is more rearward arranged with respect to the fuel cell automobile than the integral module, and the resilient pipe is more forward arranged than the fuel cell with respect to the fuel cell automobile, and wherein the resilient pipe allows one of the integral module and the fuel cell to be independently removed from the body by detaching from the pipe member.

2. The fuel cell automobile as claimed in claim 1, wherein the cooling module is arranged between a steering axis of the fuel cell automobile on one side of the fuel cell automobile regarding a traveling direction of the fuel cell automobile and a virtual axis corresponds to an axis provided when the steering axis is arranged on the other side of the fuel cell automobile regarding a traveling direction of the fuel cell automobile.

3. The fuel cell automobile as claimed in claim 1, wherein the resilient pipe comprises a rubber.

4. The fuel cell automobile as claimed in claim 1, wherein the compressor module comprises a compressor and a compressing motor.

5. The fuel cell automobile as claimed in claim 4, wherein the cooling module is supported by at least three fixing points in which one fixing point thereof is at a side of compressor and two fixing points thereof are at a side of said compressing motor.

6. A fuel cell automobile comprising:
   a body;
   a fuel cell supported by the body at an under region of a passenger's room of the fuel cell automobile for generating electric power by electrochemical reaction between hydrogen and oxygen;
   an integral module at a front region of the fuel cell automobile including a compressor module, a drive module, and a cooling module, the cooling module being arranged at a rearmost portion of the integral module;

a mounting member, a part of the integral module being supported by the body through the mounting member;

a pipe member at least partially comprising a resilient pipe, wherein the drive module comprises a transmission and a main motor, the compressor module supplies compressed air to the fuel cell through the pipe member, the cooling module cools the compressed air from the compressor to supply cooled compressed air to the fuel cell, wherein the resilient pipe comprises a first elbow, which changes the direction of the cooled compressed air from a first direction to a second direction to absorb vibration being transmitted from the cooling module to the fuel cell.

7. The fuel cell automobile as claimed in claim 6, wherein the resilient pipe comprises a second elbow, which changes the flow direction of the cooled compressed air from the second to a third direction.

* * * * *